J. H. GLAUBER.
SELF CLOSING FAUCET.
APPLICATION FILED FEB. 13, 1911.
1,027,120.
Patented May 21, 1912.
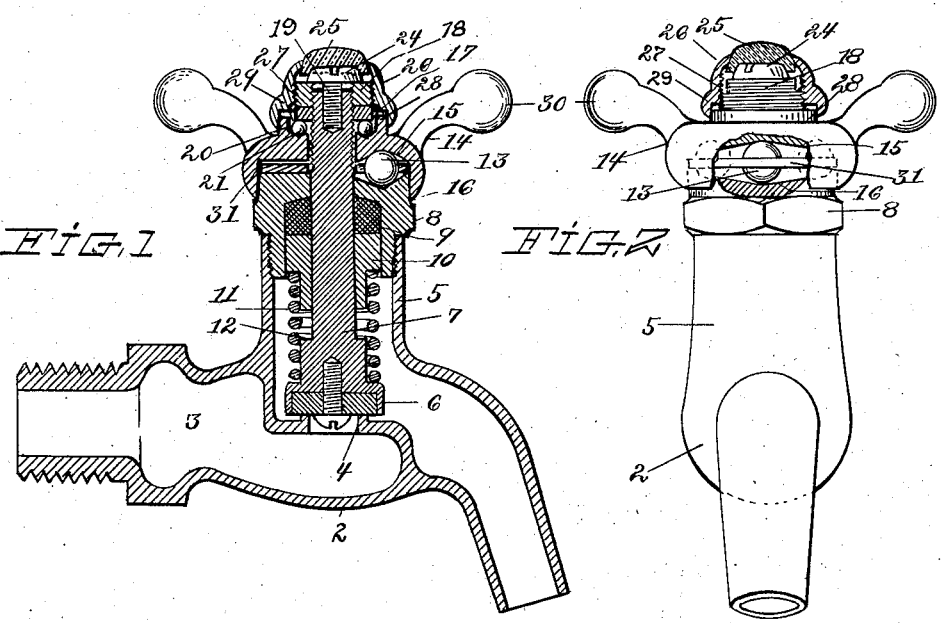

UNITED STATES PATENT OFFICE.

JOSEPH H. GLAUBER, OF CLEVELAND, OHIO.

SELF-CLOSING FAUCET.

1,027,120.   Specification of Letters Patent.   Patented May 21, 1912.

Application filed February 13, 1911. Serial No. 608,260.

*To all whom it may concern:*

Be it known that I, JOSEPH H. GLAUBER, a citizen of the United States, residing at Cleveland, in the county of Cuyahoga and State of Ohio, have invented certain new and useful Improvements in Self-Closing Faucets, of which the following is a specification.

This invention relates to improvements in self-closing faucets, and the particular improvements embodied therein comprise the construction and arrangement of parts substantially as hereinafter described and pointed out in the claims.

The chief object is to provide a durable and efficient faucet having a rotatable valve stem provided with a fixed but removable index button at its top, and which stem is adapted to be lifted by a rotatable handle supported on balls riding between inclined runways at the top of the faucet bonnet. A plain disk is used as a separator to promote uniform riding of these balls and prevent a separate loose ball from over-riding into the next adjacent runway and to avoid tilting uplift of the valve stem. To further eliminate friction and bind in operations, I provide a series of small balls between the handle and a bearing member adjustably mounted on the stem. The handle is also constructed to provide a hand grip on a higher plane than its middle portion to permit the index button to occupy a more or less retired position therein. The index button is also provided with two or more like index characters radially, so that one or the other will always appear upright at the front side of the faucet and be easily read whenever rotatable changes occur in the valve stem.

In the accompanying drawings, Figure 1 is a central vertical section of my invention, and Fig. 2 is a front elevation thereof partly in section. Fig. 3 is a plan view of the faucet with the index ring in section to disclose the lock nut and screw at the top of the valve stem. Fig. 4 is a plan view of the index button alone. Fig. 5 illustrates the locking screw, locknut, bearing washer and valve-stem in grouped but separate relation. Fig. 6 is a plan view of the ball separator. Fig. 7 is a side elevation of the upper portion of the faucet showing the handle rotated and raised and partly in section to disclose the ball separator, balls and inclines therein, and Fig. 8 shows said parts in over-riding position.

The body 2 of the faucet is representative of a common type having a main water passage 3 provided with a valve seat 4 in line with tubular neck 5. A valve 6 having a stem 7 is centrally supported for vertical movement in a bonnet 8 screwed into the top of neck 5. A packing 9 and follower gland 10, and a spring 11 encompass the valve stem within the faucet and serve their usual function of sealing and self-seating the valve upon seat 4. Follower gland 10 is free to slide within bonnet 8 to compress packing 9 upon each uplift of the valve, thereby operating more efficiently to seal the top of the faucet when the waterway is open.

Uplift of valve 6 is obtained by rotatable handle 14 having a series of reversely inclined ways 15 at its bottom corresponding to similar inclined grooves 16 in the top face of bonnet 8, and a series of balls 13, two or more in number, are confined within these ways and grooves and serve to raise the said handle when rotated, a construction now well known and in common use.

In operation, a partial rotation of handle 14 lifts valve stem 7 to its maximum, said stem projecting through the handle and having a bearing washer 17 adjustably affixed thereto by lock nut 18 and locking screw 19. An annular recess 20 in the top of handle 14 provides a race for a set of balls 21 upon which washer 17 is adapted to rest and ride, washer 17 having a flat-sided opening 22 to effect locking engagement with the flat-sided screw end 23 of stem 7, see Fig. 5. Initial setting and after-adjustment of the parts to take up wear, is obtained by nut 18 having screw engagement with stem 7, said nut having flattened sides *n* for wrench engagement. A fixed locked position of nut 18 is maintained by screw 19 having flat head 24 adapted to engage nut 18 when said screw is entered into the threaded open end of stem 7. A difference in pitch of the threads on the screw and on the outside of the stem assures permanent locking between the parts, although one part may have a right-hand thread and the other a left-hand thread, if desired.

Balls 21 are of material advantage in promoting freedom of rotation of handle 14 and also in preventing rotation of stem 7 when the handle is rotated, a feature to be desired as in this construction I mount an index button 25 on the end of the stem itself, or to be more accurate, on the top flat face of screw head 24. However, I also prefer to display two or more like designating words such as "Hot", in different radial positions on the top face of button 25, whereby when rotation of stem 7 occurs one or the other of said words will still appear upright at the front or spout side of the faucet to be easily read. Button 25 is a separate removable part of the stem, however, and may also be independently set or adjusted to bring its reading matter in line with the spout or any other part of the faucet, and locking and fastening of said button in place upon screw head 24 is obtained by a screw ring 26 which has threaded engagement with the exterior threads 27 provided for this express purpose on nut 18.

Owing to differences in thicknesses of porcelain or other index buttons, and in view of the fact that nut 18 is adjustably mounted on stem 7 to take up wear at bearing washer 17 and at valve seat 4, screw ring 26 which is fixed on said nut, must necessarily be spaced apart from the top of handle 14. But a gap between the parts is unsightly and will also permit dirt to work into recess 20 containing balls 21, all of which is overcome by providing a vertical flange 28 annularly about said recess, which flange is overlapped by a depending flange 29 on ring 26,—making a closed extensible joint. Button 25 and its ring 26 thus caps or crowns the stem and handle, the main body or hub of the handle being of larger diameter than the ring and approximately of the same size as bonnet 8. A convenient hand grip is afforded by the radial ball-tipped arms 30 or their equivalent which are preferably projected upwardly and outwardly from the middle portion 14 to bring their ball ends to a higher plane than the main body,—serving in effect to pocket the index button and its ring so that these parts will not unduly project into the palm of the hand when the handle is rotated. This will be seen to have advantage in that stem 7 and index button 25 may thus remain free and apart from the hand and will not be rotated when the handle is rotated. Other forms of handles having the above advantages may be used.

By means of a gravity disk 31 having openings 32 located at equi-distant radial points thereon, I propose to keep balls 13 apart at approximately uniform distances during their rotary travel upon bonnet 8. However, a slight variation in travel of the respective balls is accommodated by mounting each ball loosely within its opening 32, which accommodation is increased when gravity disk 31 is carried around by the balls but not lifted to a higher plane—said disk resting always on the top of the bonnet and the balls gradually rising through said openings and therefore having more room for lateral play therein. This variation within limits is desirable and advantageous in view of a possible difference in degree of the angles of the respective inclines; also in overcoming any irregularities in the grooved surfaces 15 and 16 respectively, or obstructions such as oil or dirt deposits between the parts.

Gravity disk 31 prevents two balls from occupying the same runway at the same time, but when the handle is rotated to a greater degree than is absolutely required all the balls will be jointly carried around by disk 31 to occupy the next runway—the valve closing in this movement. Joint movement of the balls from one runway to another brings them into new working relations which practically necessitate an accommodating play between them and this is an added reason for the use of a gravity disk 31 of the form and construction shown.

What I claim is:

1. In a self-closing faucet, a valve having a stem, a rotatable handle and means to lift said stem having adjusting devices to definitely relate said parts and take up wear, a separate index button, and adjustable means to detachably fasten said index button upon said adjusting devices.

2. In a self-closing faucet, a valve stem, a rotatable handle, an adjustable nut to secure said handle upon said stem, a removable index button and a screw-ring adjustably engaged with said nut to secure said index button in place in any adjusted position of said nut.

3. In a self-closing faucet, a valve stem, a rotatable handle, a nut adjustably mounted upon said stem to secure the handle rotatably thereto, a locking screw for said nut adjustably engaged with said stem, an index member adapted to seat upon said screw, and a screw ring engaged with said nut to fix said index member in any adjusted position thereon.

4. In a self-closing faucet, a valve stem, a rotatable handle, a bearing member for said handle locked against rotation upon said stem, a nut to adjustably fix said member upon said stem, a screw engaged with said stem having a head engaged with said nut, an index button seated upon said screw-head, and a screw ring to lock said button removably upon said nut.

5. In a self-closing faucet, a valve stem, a rotatable handle having a vertical annular flange at its top, a bearing member for the handle on said stem, a nut to secure said member adjustably upon said stem, means to lock said nut in adjusted position, an index button at the top of said stem, and a screw-ring to removably fasten said button in place, said ring having a depending flange opposite the flange on the handle for the purposes described.

6. In a self-closing faucet, a valve stem, a bonnet to support said stem having inclines at its top, a set of balls for said inclines, a handle having inclines upon its bottom, and a recessed ball race at its top, a set of balls for said race, a bearing washer slidably sleeved in locking relation with said stem and having fastening devices therefor to adjustably secure it to said stem, and a cap crowning said handle and stem parts.

7. In a self-closing faucet, a valve having a stem, a handle free to revolve upon said stem, a bonnet to support said stem, said handle and bonnet having inclined surfaces terminating in angular ridges, balls to ride upon said inclined surfaces, in combination with a gravity disk having openings at different radial points therein adapted to loosely confine the balls, said disk being free to rotate without upward movement during rotative movement of said handle and up-travel of said balls.

8. In a self-closing faucet, a valve having a stem, a spring to seat said valve, means to lift said valve comprising a rotatable handle and a bonnet having oppositely disposed inclines and balls adapted to ride thereon, in combination with a gravity disk having openings at equi-distant radial points for the balls, said balls being free of said disk and adapted to move upwardly in respect thereto during their rotary travel over the said inclines.

9. In a self-closing faucet, a valve, a rotatable handle to open said valve, balls and inclined runways therefor to cause uplift of said handle and valve, in combination with a gravity disk having openings therein to loosely confine said balls with an accommodating movement for the purposes described.

In testimony whereof I affix my signature in the presence of two witnesses.

JOSEPH H. GLAUBER.

Witnesses:
R. B. MOSER,
F. C. MUSSUN.

---

Copies of this patent may be obtained for five cents each, by addressing the "Commissioner of Patents, Washington, D. C."